United States Patent
Gao et al.

(10) Patent No.: US 11,615,784 B2
(45) Date of Patent: Mar. 28, 2023

(54) CONTROL METHOD AND CONTROL APPARATUS FOR SPEECH INTERACTION

(71) Applicant: BEIJING BAIDU NETCOM SCIENCE AND TECHNOLOGY CO., LTD., Beijing (CN)

(72) Inventors: Cong Gao, Beijing (CN); Saisai Zou, Beijing (CN); Jinfeng Bai, Beijing (CN); Lei Jia, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 108 days.

(21) Appl. No.: 17/118,869

(22) Filed: Dec. 11, 2020

(65) Prior Publication Data

US 2021/0407494 A1 Dec. 30, 2021

(30) Foreign Application Priority Data

Jun. 30, 2020 (CN) .......................... 202010622594.5

(51) Int. Cl.
*G10L 15/00* (2013.01)
*G10L 15/08* (2006.01)
*G10L 15/22* (2006.01)
*G10L 15/02* (2006.01)
*G10L 15/14* (2006.01)

(52) U.S. Cl.
CPC .............. *G10L 15/08* (2013.01); *G10L 15/22* (2013.01); *G10L 15/02* (2013.01); *G10L 15/14* (2013.01); *G10L 2015/088* (2013.01)

(58) Field of Classification Search
CPC combination set(s) only.
See application file for complete search history.

(56) References Cited

U.S. PATENT DOCUMENTS

| 10,276,161 | B2 * | 4/2019 | Hughes | ................... G10L 15/02 |
| 10,861,446 | B2 * | 12/2020 | Yasa | ..................... G06F 16/313 |
| 11,164,570 | B2 * | 11/2021 | Nadkar | ................... G06F 3/167 |
| 11,361,756 | B2 * | 6/2022 | Smith | ..................... G10L 15/22 |
| 2020/0013407 | A1 | 1/2020 | Chae | |

FOREIGN PATENT DOCUMENTS

| CN | 109360567 A | 2/2019 |
| JP | 2020502555 A | 1/2020 |
| WO | 2019026313 A1 | 2/2019 |

(Continued)

OTHER PUBLICATIONS

Office Action for Japanese Application No. 2021-002323, dated Feb. 15, 2022, 4 pages.

(Continued)

*Primary Examiner* — Vu B Hang
(74) *Attorney, Agent, or Firm* — Lippes Mathias LLP

(57) ABSTRACT

The present disclosure discloses a control method and a control apparatus for speech interaction. The detailed implementation solution of the control method for the speech interaction includes: collecting an audio signal; detecting a wake-up word in the audio signal to obtain a wake-up word result; and playing a prompt tone and/or executing a speech instruction in the audio signal based on the wake-up word result.

17 Claims, 7 Drawing Sheets

(56) References Cited

FOREIGN PATENT DOCUMENTS

WO          2020068909 A1      4/2020

OTHER PUBLICATIONS

Extended European Search Report for Application No. 21150163.0, dated Jun. 29, 2021, 10 pages.
Assaf Hurwitz Michaely et al., "Keyword Spotting for Google Assistant Using Contextual Speech Recognition", ASRU Dec. 16, 2017, 8 pages.
Office Action to Japanese Application No. 2021-002323, dated Aug. 30, 2022, 3 pages.

* cited by examiner

CONTROL METHOD AND CONTROL APPARATUS FOR SPEECH INTERACTION

CROSS-REFERENCE TO RELATED APPLICATION

The present application is based upon and claims priority to Chinese Patent Application No. 202010622594.5, filed on Jun. 30, 2020, the entirety contents of which are incorporated herein by reference.

FIELD

The present disclosure relates to a field of computer technologies, and more particularly to fields of speech recognition, man-machine interaction and depth learning technologies.

BACKGROUND

With the development of the speech technology and man-machine interaction technology, an intelligent terminal device (referred as a speech interaction terminal) which may interact with a user via a speech is invented, such as an intelligent speaker, an intelligent home system and an intelligent watch.

A wake-up word with four syllables, such as "Xiao Du, Xiao Du", is generally employed during an existing speech interaction terminal is used. After the wake-up word is recognized, the speech interaction terminal sends out a prompt tone for prompting the user to continue sending a speech instruction. Then, the speech interaction terminal responds to the speech instruction sent by the user. In this case, one instruction may be responded to by generally taking two rounds of interaction. It can be seen that the existing wake-up word is long and the interaction procedure is cumbersome.

SUMMARY

The present disclosure provides a control method and a control apparatus for speech interaction.

According to embodiments of the present disclosure, a control method for speech interaction is provided. The control method includes: collecting an audio signal; detecting a wake-up word in the audio signal to obtain a wake-up word result; and playing a prompt tone and/or executing a speech instruction in the audio signal based on the wake-up word result.

According to embodiments of the present disclosure, a control method for speech interaction is provided. The control method includes: obtaining an audio signal; detecting a wake-up word at a front part of the audio signal to obtain a wake-up word result, and detecting a speech instruction subsequent to the wake-up word to obtain a speech instruction result; and controlling a speech interaction terminal to play a prompt tone and/or to execute the speech instruction based on at least one of the wake-up word result and the speech instruction result.

According to embodiments of the present disclosure, a control apparatus for speech interaction is provided. The control apparatus includes: a non-transitory computer-readable medium including computer-executable instructions stored thereon, and an instruction execution system which is configured by the instructions to implement at least one of: a collecting module, a detecting module, and an executing module. The collecting module is configured to collect an audio signal. The detecting module is configured to detect a wake-up word in the audio signal to obtain a wake-up word result. The executing module is configured to play a prompt tone and/or to execute a speech instruction in the audio signal based on the wake-up word result.

It should be understood that, contents described in this section are not intended to identify key or important features of embodiments of the present disclosure, nor is it intended to limit the scope of the present disclosure. Other features of the present disclosure may become apparent from the following description.

BRIEF DESCRIPTION OF THE DRAWINGS

The accompanying drawings are used for better understanding the solution and do not constitute a limitation of the present disclosure.

DETAILED DESCRIPTION

Description will be made below to exemplary embodiments of the present disclosure with reference to accompanying drawings, which includes various details of embodiments of the present disclosure to facilitate understanding and should be regarded as merely examples. Therefore, it should be recognized by the skilled in the art that various changes and modifications may be made to the embodiments described herein without departing from the scope and spirit of the present disclosure. Meanwhile, for clarity and conciseness, description for well-known functions and structures is omitted in the following description.

Figure 1:
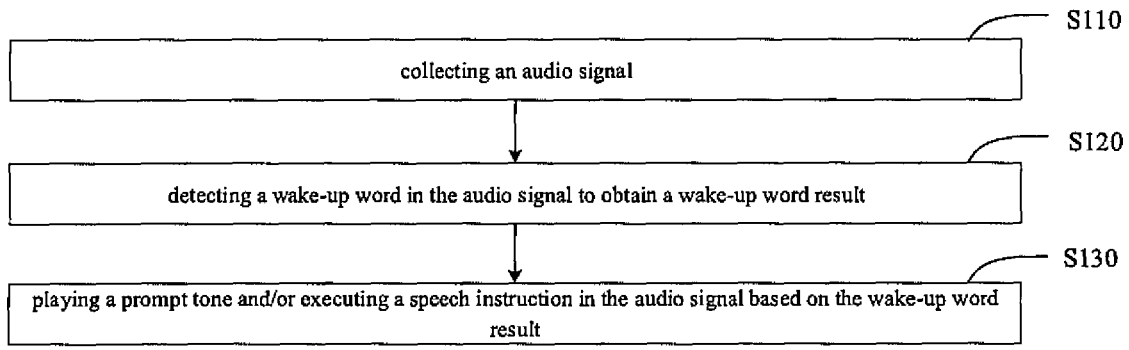
FIG. 1 is a flow chart illustrating a control method for speech interaction according to a first embodiment of the present disclosure.

According to embodiments of the present disclosure, FIG. 1 is a flow chart illustrating a control method for speech interaction according to a first embodiment of the present disclosure. Embodiments of the present disclosure are applicable to a case for detecting a wake-up word from an audio signal. The method is implemented by a control apparatus for speech interaction. The control apparatus is implemented by software and/or hardware, and is specifically configured in an electronic device with certain data operation capability. The electronic device includes, but is not limited to, an intelligent device such as a speech interaction terminal and a server. The speech interaction terminal includes, but is not limited to, an intelligent speaker, an intelligent home system and an intelligent watch.

As illustrated in FIG. 1, a control method for speech interaction includes the following.

At block S110, an audio signal is collected.

The electronic device is disposed with a microphone for collecting the audio signals around the electronic device in real time. Since there are multiple conditions, the electronic device may collect a speech instruction for interaction between the user and the speech interaction terminal, a speech signal for communication between the users or between things, or a non-speech signal such as a sound from rain or a TV set, which may be collectively referred as the audio signal.

In order to facilitate the electronic device to detect the speech instruction of the user interacting with the electronic device from the audio signal and to distinguish the speech instruction from other signals, it is a common operation in the related art to add a wake-up word at the front of the speech instruction. When the wake-up word is detected, an audio signal subsequent to the wake-up word is considered as the speech instruction.

In an application scenario, the user sends out a speech "Xiao du (a name of an intelligent assistant), turn off the light" to the electronic device at one time, where the "Xiao du" is a wake-up word, and the "turn off the light" is a speech instruction. An audio signal corresponding to the speech instruction "turn off the light" is collected by the electronic device.

At block S120, a wake-up word in the audio signal is detected to obtain a wake-up word result.

At least one wake-up word is preset by the electronic device. In this embodiment, content and the number of syllables of the wake-up word are not limited. In some embodiments, the content and the number of syllables of the wake-up word may be independently set by the user.

The syllable refers to a smallest phonetic unit of a combined pronunciation of a single vowel phoneme and a single consonant phoneme in a phonological family. The syllable may be a Chinese syllable or an English syllable. The Chinese syllable (a pronunciation syllable of a Chinese character) is generally a spelling syllable with a combination of an initial and a final, a spelling syllable with a combination of two finals, and a syllable with a single final. The consonant phoneme in the phonological family is used to mark an initial phoneme of the Chinese character. A combination of the vowel phoneme and the consonant phoneme is used to mark a final phoneme of the Chinese character. In English, a vowel is especially loud. One vowel phoneme may form one syllable, and a combination of one vowel phoneme and one or more consonant phonemes may also form one syllable. For example, the number of syllables of the wake-up word may be simply understood as the number of Chinse characters or the number of vowel phonemes.

With this embodiment, the wake-up word in the audio signal is detected by employing a speech recognition technology. An acoustic feature in the audio signal is extracted and input into a wake-up word detection model trained in advance. The wake-up word detection model is obtained by training audio signals corresponding to various wake-up words. The wake-up word detection model is configured to detect whether the audio signal includes the wake-up word, and to detect the content and the number of syllables of the wake-up word.

In the application scenario, when the audio signal is "Xiao Du, turn off the light", the wake-up word "Xiao Du" is detected from the audio signal. When the audio signal is "Xiao Du, Xiao Du, turn off the light", the wake-up word "Xiao Du, Xiao Du" is detected from the audio signal.

At block S130, a prompt tone is played and/or a speech instruction in the audio signal is executed based on the wake-up word result.

The wake-up word result includes: whether the audio signal includes the wake-up word and the content of the wake-up word. Different wake-up word results have correspondence with the operations to be performed. At least one of playing the prompt tone and executing the speech instruction may be performed based on different wake-up word results.

In this embodiment, the prompt tone is a response tone sent by the electronic device to the user in response to the wake-up word, and is used to remind the user that the electronic device has been awakened. The speech instruction may be issued, such as "here", "what's wrong" and "please speak". The speech instruction comes from the audio signal. A type of the speech instruction includes, but is not limited to, a function execution instruction of the electronic device and an instruction for controlling an external intelligent device. For example, when the electronic device is the intelligent speaker, if the wake-up word result includes "Xiao Du", only the speech instruction may be executed. If the wake-up word includes "Xiao Du, Xiao Du", only the prompt tone may be played, or both the prompt tone and the speech instruction may be executed. If the wake-up word result does not include any wake-up word, no operation may be performed. It should be noted that, the speech instruction may be executed after the prompt tone completes playing when both the prompt tone and the speech instruction are executed.

With the control method for the speech interaction according to this embodiment, the wake-up word and the speech instruction are allowed to be send out together by the user. The wake-up word in the audio signal is detected, and the prompt tone is played and/or the speech instruction is executed based on the detected wake-up word result, such that the response for the speech instruction is completed by one round of interaction, the of the user is met, the interaction length is reduced, and the speech instruction may reach to the electronic device and be responded quickly.

In addition, following technical effects may also be achieved in this embodiment. A use cost of a new user is reduced, and all users who newly use the speech interaction terminal may freely experience the electronic device without familiarization exercises.

Figure 2:
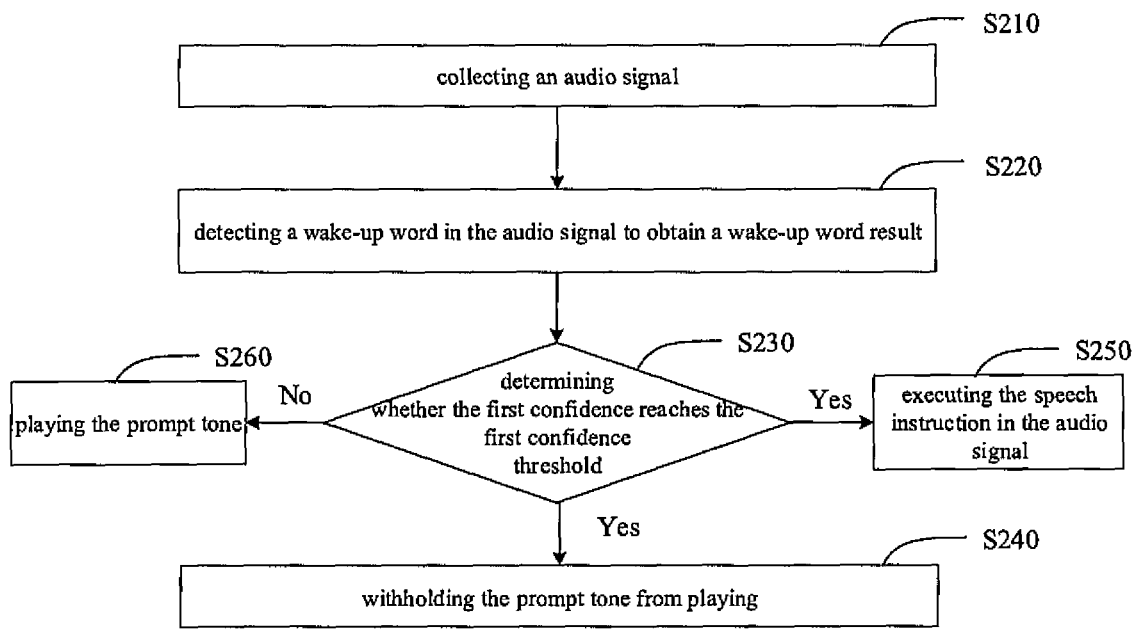
FIG. 2 is a flow chart illustrating a control method for speech interaction according to a second embodiment of the present disclosure.

According to embodiments of the present disclosure, FIG. 2 is a flow chart illustrating a control method for speech interaction according to a second embodiment of the present disclosure. This embodiment is optimized on the basis of the above embodiment.

In some embodiments, the operation "playing a prompt tone and/or executing a speech instruction in the audio signal based on the wake-up word result" is refined into the operation "executing the speech instruction in a case that a first confidence reaches a first confidence threshold; and playing the prompt tone in a case that the first confidence fails to reach the first confidence threshold".

When or before the operation "executing a speech instruction in the audio signal based on the wake-up word result", the operation "withhold from playing the prompt tone" is performed.

The control method for the speech interaction illustrated in FIG. 2 includes the following.

At block S210, an audio signal is collected.

At block S220, a wake-up word in the audio signal is detected to obtain a wake-up word result.

In this embodiment, the wake-up word result includes a first confidence. The first confidence is configured to represent a reliability that the audio signal includes a target wake-up word. The target wake-up word is a set wake-up word. For convenience of description and distinction, the reliability representing that the audio signal includes the target wake-up word is referred as the first confidence. In some embodiments, the wake-up word detection model is employed to detect the first confidence, which will be described in detail in following embodiments.

At block S230, it is determined whether the first confidence reaches the first confidence threshold; if yes, that is, the target wake-up word is detected, the action at blocks 240 and 250 is performed; otherwise, that is, the target wake-up word is not detected, the action at block 260 is detected.

The first confidence threshold may be a confidence threshold or a confidence interval, which represents a critical point of the reliability that the audio signal includes the target wake-up word. If the first confidence reaches the first confidence threshold, such as exceeding the first confidence threshold, it is considered that the target wake-up word is detected. If the first confidence fails to reach the first confidence threshold, such as not exceeding the first confidence threshold, it is considered that the target wake-up word is not detected.

At block S240, the prompt tone is withheld from playing. That is, the prompt tone is not played.

After the electronic device detects the target wake-up word, it has a high probability that the speech instruction follows the target wake-up word. Therefore, the prompt tone is not played to avoid causing significant disturbance to the user. At the same time, an "overlapping response" state caused by overlapping of a subsequent speech instruction and the prompt tone is avoided. It is also avoided that the detection accuracy is affected by interference of the speech instruction.

At block S250, the speech instruction in the audio signal is executed.

It should be noted that, the action at blocks S240 and S250 may be executed in parallel, the action at block S240 may be performed before the action at block S250, or the action at block S250 may be performed before the action at block S240.

At block S260, the prompt tone is played.

When the target wake-up word is not detected, it is possible that other wake-up word or no wake-up word is sent out by the user, so the prompt tone may be played. The user sends out the speech instruction after listening to the prompt tone, and then the speech instruction is executed. The action essentially realizes two rounds of interaction.

With this embodiment, a unique response mechanism of the prompt tone is designed. No prompt tone is issued after the target wake-up word is detected. A prompt response procedure and a speech interaction procedure of a conventional ordinary wake-up word and a non-prompt tone procedure of the target wake-up word are simultaneously supported, thereby improving the fault tolerance and meeting the diversified usage habits of the user.

Figure 3:
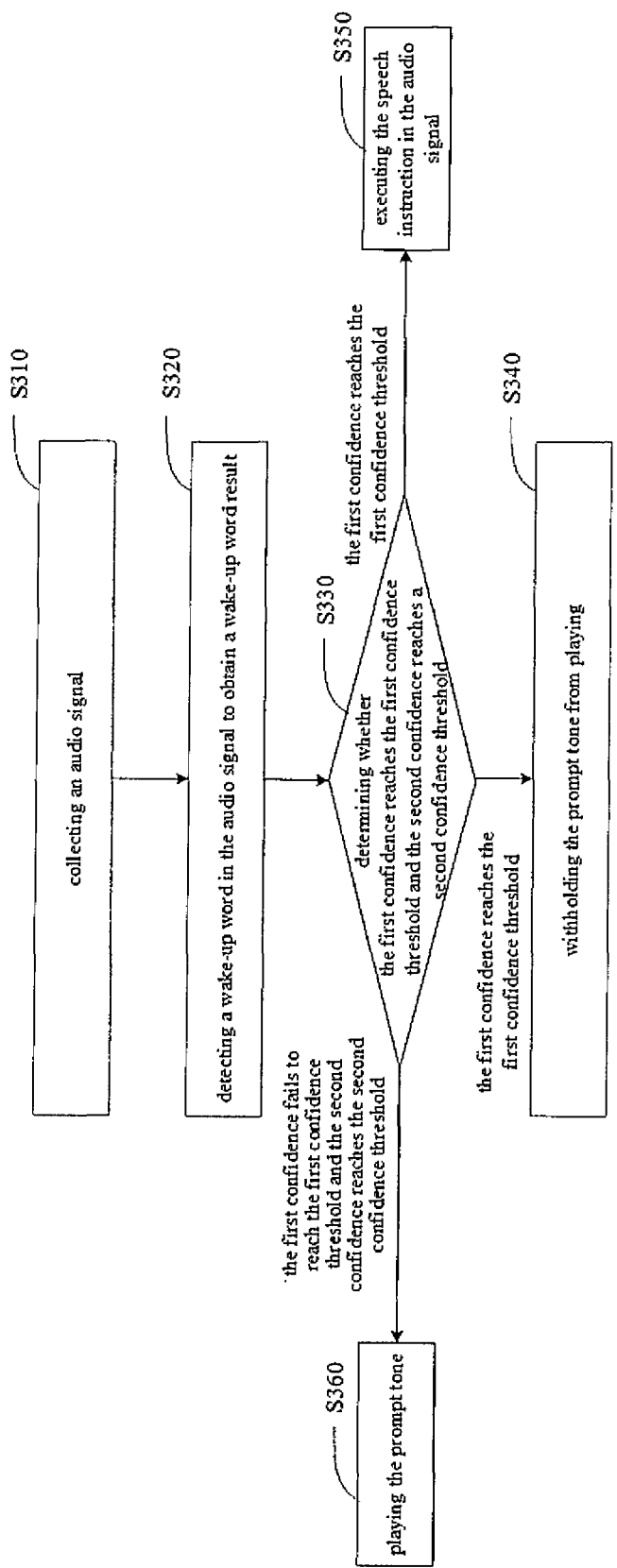
FIG. 3 is a flow chart illustrating a control method for speech interaction according to a third embodiment of the present disclosure.

According to embodiments of the present disclosure, FIG. 3 is a flow chart illustrating a control method for speech interaction according to a third embodiment of the present disclosure. This embodiment is optimized on the basis of the above embodiments.

In some embodiments, the operation "playing a prompt tone based on the wake-up word result" is refined into the operation "playing the prompt tone in a case that the second confidence reaches a second confidence threshold and the first confidence fails to reach the first confidence threshold".

The control method for the speech interaction illustrated in FIG. 3 includes the following. At block S310, an audio signal is collected.

At block S320, a wake-up word in the audio signal is detected to obtain a wake-up word result.

In some embodiments, the wake-up word detection model is employed to detect the wake-up word, including but not limited to a Gaussian mixture model, a Markov chain and a hidden Markov model. In detail, the audio signal is input to the wake-up word detection model, to output the wake-up word result. The wake-up word result includes: the first confidence representing the reliability that the audio signal includes the target wake-up word, and the second confidence representing the reliability that the audio signal includes the ordinary wake-up word. For the convenience of description and distinction, the reliability representing that the audio signal includes the ordinary wake-up word is referred as the second confidence. In some embodiments, the wake-up word detection model is employed to detect the second confidence.

At block S330, it is determined whether the second confidence reaches a second confidence threshold and the first confidence reaches the first confidence threshold. When the first confidence reaches the first confidence threshold, the action at blocks S340 and S350 is performed. When the first confidence fails to reach the first confidence threshold and the second confidence reaches the second confidence threshold, the action at block S360 is performed.

In some embodiments, the action at block S330 may be performed by employing the wake-up word detection model. A last layer of the wake-up word detection model may be set as a classification layer, which is configured to input the first confidence and the second confidence. A classification result which reaches or fails to reach a confidence threshold is output by comparing respective confidence thresholds.

Similar to the first confidence threshold, the second confidence threshold may be a confidence threshold or a confidence interval, which represents a critical point of the reliability that the audio signal includes the ordinary wake-up word. When the second confidence reaches the second confidence threshold, such as exceeding the second confidence threshold, it is considered that the ordinary wake-up word is detected. When the second confidence fails to reach the second confidence threshold, such as not exceeding the second confidence threshold, it is considered that the ordinary wake-up word is not detected.

Based on the above description, problems to be solved in the wake-up word detection model include: 1) detecting the target wake-up word; 2) detecting the ordinary wake-up word; and 3) distinguishing the target wake-up word from the ordinary wake-up word. For the problems, one or more wake-up word detection models may be employed to solve the problems in a practical application scenario.

When one wake-up word detection model is employed, the wake-up word detection model detects the target wake-up word and the ordinary wake-up word in the audio signal, and obtains the first confidence and the second confidence at the same time, and then determines whether the wake-up word is detected and whether the wake-up word is the target wake-up word or the ordinary wake-up word based on the first confidence and the second confidence.

When two wake-up word detection models are employed, one wake-up word detection model is configured to detect the target wake-up word in the audio signal to obtain the first confidence. The other wake-up word detection model is configured to detect the ordinary wake-up word in the audio signal to obtain the second confidence. Then, it is determined whether the wake-up word is detected, and whether the wake-up word is the target wake-up word or the ordinary wake-up word based on the first confidence and the second confidence.

When three wake-up word detection models are employed, one wake-up word detection model is configured to detect the target wake-up word in the audio signal to obtain the first confidence. Another wake-up word detection model is configured to detect the ordinary wake-up word in the audio signal to obtain the second confidence. Yet another wake-up word detection model is configured to determine whether the wake-up word is detected, and whether the wake-up word is the target wake-up word or the ordinary wake-up word based on the first confidence and the second confidence.

At block S340, the prompt tone is withheld from playing.

At block S350, the speech instruction in the audio signal is executed.

It should be noted that, the action at blocks S340 and S350 may be executed in parallel, the action at block S340 may be performed before the action at block S350, or the action at block S350 may be performed before the action at block S340.

At block S360, the prompt tone is played.

With this embodiment, the target wake-up word and the ordinary wake-up word are detected at the same time by employing the wake-up word detection model, and it is determined whether the wake-up word is detected and whether the wake-up word is the target wake-up word or the ordinary wake-up word based on the confidences, thereby ensuring certain detection precision of the target wake-up word and the ordinary wake-up word, and avoiding the prompt tone disturbance caused by a false alarm of the wake-up word to the user.

In the above embodiments and following embodiments, content and the number of syllables of the target wake-up word and content and the number of syllables of the ordinary wake-up word may be set. Accordingly, when different contents and syllables are set, wake-up word detection methods are also different. Several wake-up words and alternative detection methods are described in detail below based on conditions where the target wake-up word is the same as or different from the ordinary wake-up word.

Condition one: the number of syllables of the target wake-up word is the same as that of the ordinary wake-up word.

In this condition, the number of syllables of the target wake-up word is the same as that of the ordinary wake-up word, but the content of the target wake-up word is different that of the ordinary wake-up word. For example, the target wake-up word is "one two three", and the ordinary wake-up word is "four five six". Description for the syllable may refer to the above embodiments, which is not elaborated here. In a detecting procedure, one wake-up word detection model may be employed to detect the target wake-up word and the ordinary wake-up word in the audio signal at the same time, and provide the first confidence and the second confidence. Two wake-up word detection models may also be employed to detect the target wake-up word and the ordinary wake-up word in the audio signal, and respectively provide the first confidence and the second confidence. Further, another wake-up word detection model may be employed to determine whether the wake-up word is detected, and whether the wake-up word is the target wake-up word or the ordinary wake-up word based on the first confidence and the second confidence.

Condition two: the ordinary wake-up word includes one target wake-up word.

The target wake-up word is a part of the ordinary wake-up word. The number of syllables of the target wake-up word is less than that of the ordinary wake-up word. For example, the target wake-up word is "Xiao Wu", and the ordinary wake-up word is "Xiao Wu student". In this case, the method provided in condition one may be used for detection. Considering an inclusion relationship between the target wake-up word and the ordinary wake-up word, the target wake-up word and the ordinary wake-up word may be detected successively by the wake-up word detection model based on a position of the wake-up word in the ordinary wake-up word. In some embodiments, the target wake-up word is at a front part of the ordinary wake-up word. For example, the "Xiao Wu" is located at the front of the "Xiao Wu student". A primary detection is performed on the target wake-up word in the audio signal by employing the wake-up word detection model, to obtain a first detection result. A secondary detection is performed on a remaining part (such as "student") of the ordinary wake-up word except the target wake-up word within a set period after the primary detection, to obtain a second detection result. The first confidence and the second confidence are determined based on the first detection result and the second detection result. It is assumed that the set period is 0.5 seconds. When the remaining part is detected within the 0.5 seconds after the target wake-up word is detected, the second confidence is high. When the remaining part is not detected within the 0.5 seconds after the target wake-up word is detected, the first confidence is high. When the target wake-up word is not detected, the ordinary wake-up word may not be detected in the primary detection, both the first confidence and the second confidence are low.

When the target wake-up word is at a behind part of the ordinary wake-up word, such as "student" and "Xiao Wu student", the wake-up word detection model is employed to perform a primary detection on a remaining part (such as "Xiao Wu") of the ordinary wake-up word except the target wake-up word to obtain a first detection result; to perform a secondary detection on the target wake-up word within a set period after the primary detection to obtain a second detection result; and to determine the first confidence and the second confidence based on the first detection result and the second detection result. It is assumed that the set time may be 0.5 seconds. When the target wake-up word is detected within the 0.5 seconds after the remaining part is detected, the second confidence is high. When the target wake-up word is not detected within the 0.5 seconds after the remaining part is detected, both the first confidence and the second confidence are low. When the remaining part is detected in the primary detection, but the target wake-up word is detected after the 0.5 seconds, the first confidence is high.

Condition three: the ordinary wake-up word includes at least two target wake-up words.

The target wake-up word is a part of the ordinary wake-up word, and the number of syllables of the target wake-up word is less than that of the ordinary wake-up word. Different from the condition second, the ordinary wake-up word includes more than two target wake-up words. In this case, the method provided in the condition one may be employed for detection. Considering the inclusion relationship between the target wake-up words and the ordinary wake-up word, the target wake-up word and the ordinary wake-up word may be successively detected by employing one wake-up word detection model. In an application scenario, the ordinary wake-up word only includes two target wake-up words. For example, the ordinary wake-up word is "Xiao A, Xiao A" and the target wake-up word is "Xiao A". For another example, the ordinary wake-up word is "handsome boy, handsome boy", and the target wake-up word is "handsome boy". With respect to setting for the number of ordinary wake-up words and the number of target wake-up words, the wake-up word detection procedure is defined as follows. In detail, by employing the wake-up word detection model, a primary detection is performed on the target wake-up words in the audio signal to obtain a first detection result, a secondary detection is performed on the target wake-up words within a set period after the primary detection to obtain a second detection result; and the first confidence and the second confidence are determined based on the first detection result and the second detection result. It is assumed that the set time may be 0.5 seconds. When the target wake-up word is detected again within the 0.5 seconds after the target wake-up word is detected, the second confidence is high. When the target wake-up word is not detected within the 0.5 seconds after the target wake-up word is detected, the first confidence is high. When the target wake-up word is not detected in the primary detection, and the ordinary wake-up word is not detected, both the first confidence and the second confidence are low. In this embodiment, the ordinary wake-up word includes two target wake-up words, which is convenient for the reception of the user. Furthermore, by performing detection on the target wake-up word twice, the target wake-up word and the ordinary wake-up word may be accurately distinguished.

Condition four: the ordinary wake-up word is a word with more than four syllables, and the target wake-up word is a word with less than four syllables.

In this condition, there is no restriction on the content of the ordinary wake-up word and the content of the target wake-up word. Referring to the condition two and the condition three, the target wake-up word is included in the ordinary wake-up word. In addition, the content of the target wake-up word may be completely different from that of the ordinary wake-up word. For example, the target wake-up word is "Xiao du" and the ordinary wake-up word is "Xiao Wu student". In this case, the method provided in the condition one may be employed for detection.

In this embodiment, the number of syllables of the target wake-up word is decreased, especially decreased from four syllables to two syllables, which is more in line with the usage habit of the user in real life. For example, the usage habit that the user sends out two Chinese characters enables the intuitive experience more humanized and the communication with the electronic device more natural, and is more in line with the natural way of human communication.

It should be noted in the above detection procedure that, considering that both the first confidence threshold and the second confidence threshold may be reached at the same time, the ordinary wake-up word and the target wake-up word need to be clearly distinguished to avoid confusion. There is a high false alarm rate for the target wake-up word with less than four syllables due to the limitation of the current speech detection technology. Therefore, it is impossible for the speech interaction terminal to issue the prompt tone when a suspected ordinary wake-up is found, otherwise significant disturbance may be caused to the user. In addition, for further avoiding the interruption caused by the prompt tone to the user, and also for facilitating the user to operate the device by adaption a mode of "target wake-up word+speech instruction" to the greatest extent, when the target wake-up word actually exists, the target wake-up word must not be detected as the ordinary wake-up word. When the ordinary wake-up word actually exists, a small number of wake-up words are allowed to be detected as the target wake-up word. In this case, when the first confidence reaches the first confidence threshold, and no matter whether the second confidence reaches the second confidence threshold, it is determined that the target wake-up word is detected. When the first confidence fails to reach the first confidence threshold and the second confidence reaches the second confidence threshold, it is determined that the ordinary wake-up word is detected. When the first confidence fails to reach the first confidence threshold and the second confidence fails to reach the second confidence threshold, it is determined that no wake-up word is detected.

Figure 4A:
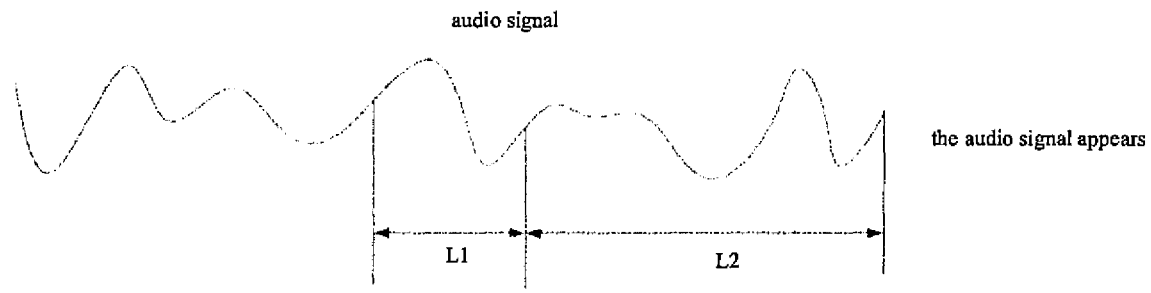
FIG. 4a is a schematic diagram illustrating an audio signal according to embodiments of the present disclosure.

In the above embodiments and following embodiments, the speech instruction is obtained by detecting a part subsequent to the wake-up word in the audio signal. FIG. 4a is a schematic diagram illustrating an audio signal according to embodiments of the present disclosure. The audio signal is distributed at the front part and the behind part of the wake-up word. The audio signal corresponding to the wake-up word is L1, and the audio signal subsequent to the wake-up word is L2 until the audio signal disappears. The speech instruction is obtained by detecting L2. In some embodiments, a voice activity detection (VAD) technology is employed to detect whether the audio signal disappears.

In this embodiment, the user is allowed to say the wake-up word and the speech instruction at one time without pause, and only one round of interaction is needed to complete the response for the speech instruction, thereby simplifying the interaction procedure. It should be noted that, the wake-up word here is not limited to the target wake-up word and the ordinary wake-up word.

Figure 4B:
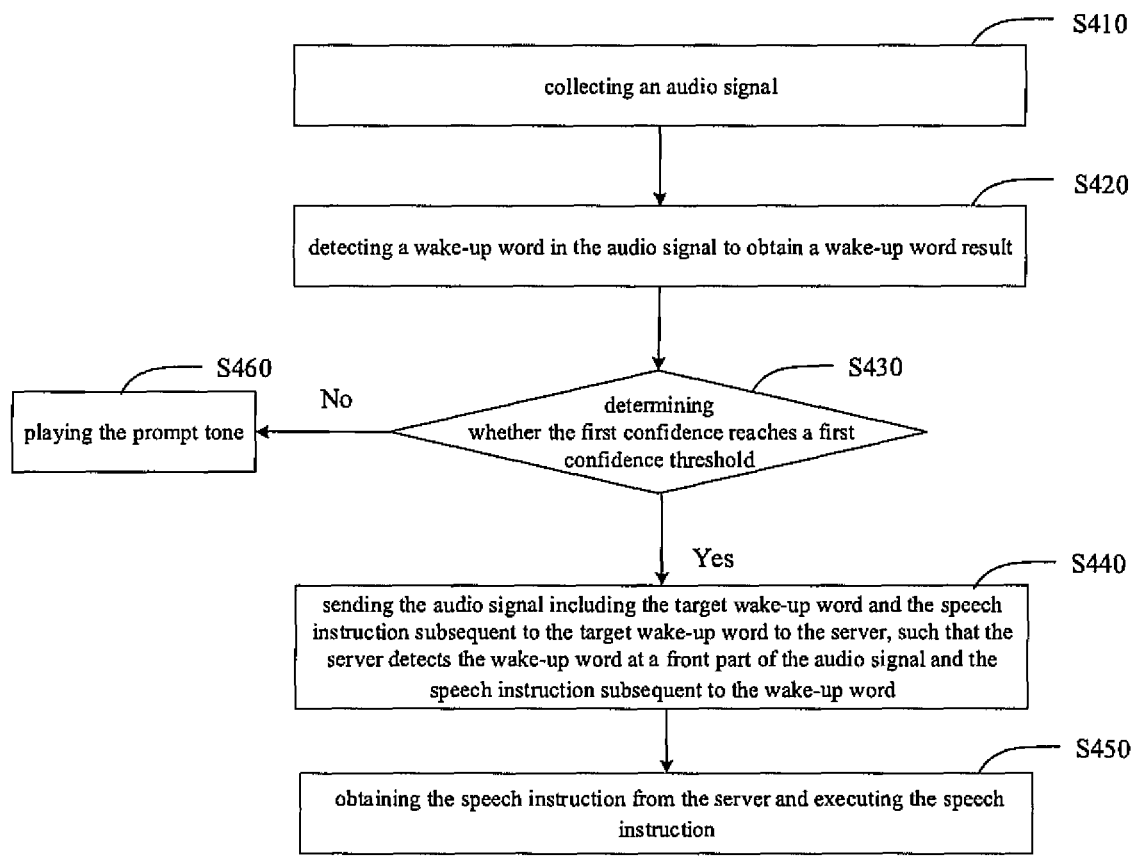
FIG. 4b is a flow chart illustrating a control method for speech interaction according to a fourth embodiment of the present disclosure.

FIG. 4b is a flow chart illustrating a control method for speech interaction according to a fourth embodiment of the present disclosure. In some embodiments, the executive subject is defined as the speech interaction terminal. The operation "executing the speech instruction in a case that the first confidence reaches a first confidence threshold" is refined into the operation "sending the audio signal including the target wake-up word and the speech instruction subsequent to the target wake-up word to a server in the case that the first confidence reaches the first confidence threshold, such that the server detects the wake-up word at a front part of the audio signal and the speech instruction subsequent to the wake-up word; and obtaining the speech instruction from the server and executing the speech instruction".

The control method for the speech interaction illustrated in FIG. 4b includes the following.

At block S410, an audio signal is collected.

At block S420, a wake-up word in the audio signal is detected to obtain a wake-up word result.

The speech interaction terminal is configured to collect the audio signal in real time and to detect a collected audio signal. The detailed description for the detection may refer to the above embodiments, which is not described here. There is a high false alarm rate of the target wake-up word with less than four syllables due to the limited detection ability of the speech interaction terminal. Therefore, the server is needed to further detect the wake-up word.

At block S430, it is determined whether the first confidence reaches a first confidence threshold; if yes, that is, the target wake-up word is detected, the action at block S440 is performed; otherwise, that is, the target wake-up word is not detected, the action at block 460 is performed.

At block S440, the audio signal including the target wake-up word and the speech instruction subsequent to the target wake-up word is sent to the server, such that the server detects the wake-up word at a front part of the audio signal and the speech instruction subsequent to the wake-up word. Then the action at block S450 is performed.

The prompt tone is withheld from playing when the target wake-up word is detected, and an audio signal corresponding to the target wake-up word and a subsequent audio signal are transmitted without the prompt tone.

Figure 4C:
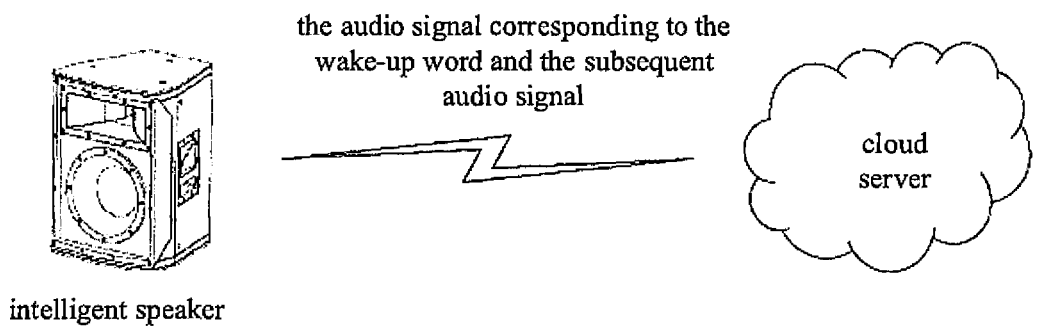
FIG. 4c is a schematic diagram illustrating an interaction between an intelligent speaker and a cloud server according to embodiments of the present disclosure.

FIG. 4c is a schematic diagram illustrating an interaction between an intelligent speaker and a cloud server according to embodiments of the present disclosure. The intelligent speaker sends the audio signal corresponding to the target wake-up word and the subsequent audio signal to the cloud server. The cloud server detects the wake-up word at the front part of the audio signal and the speech instruction subsequent to the wake-up word. There is a high misjudgment rate (there may be the ordinary wake-up word or a noise) of the speech interaction terminal due to the less number of syllables of the target wake-up word. Therefore, the cloud server needs to detect again whether the front part of the audio signal includes the wake-up word and the speech instruction subsequent to the wake-up word. The re-detection for the wake-up word at the front part of the audio signal will be described in following embodiments.

At block S450, the speech instruction is obtained from the server and the speech instruction is executed.

In an application scenario, the user sends out a speech "Xiao Du, turn off the light" to the speech interaction terminal at one time. The speech interaction terminal does not issue a prompt tone after detecting the target wake-up word "Xiao Du", but directly sends the audio signal of the speech "Xiao Du, turn off the light" to the server. The server detects the target wake-up word again, detects a speech instruction "turn off the light" subsequent to the target wake-up word at the same time, and controls the speech interaction terminal to turn off the light. In an implementation, a light has an infrared switch and the intelligent speaker has an infrared emitting component. The cloud server detects the speech instruction "turn off the light", and feeds back an infrared code for turning off the light to the intelligent speaker. The intelligent speaker transmits the infrared code to control the light to turn off. In another implementation, the light is connected to the intelligent speaker via a local area network (LAN). The cloud server detects the speech instruction "turn off the light" and sends the speech instruction to the intelligent speaker. The intelligent speaker sends the speech instruction to the light via the local area network to control the light to turn off.

At block S460, the prompt tone is played.

In this embodiment, the audio signal including the target wake-up word and the speech instruction is sent to the server, such that the server detects the wake-up word at the front part of the audio signal and the speech instruction subsequent to the wake-up word. An audio signal suspected of a combination of the target wake-up word and the speech instruction sent by the speech interaction terminal is detected as a whole audio signal (i.e. target wake-up word+ speech instruction). Detection for the front part of the wake-up word is effectively assisted by the detection for the speech instruction. When the speech instruction is not detected, it indirectly indicates that the detection for the target wake-up word is wrong, thereby reducing the false alarm rate.

Figure 5:
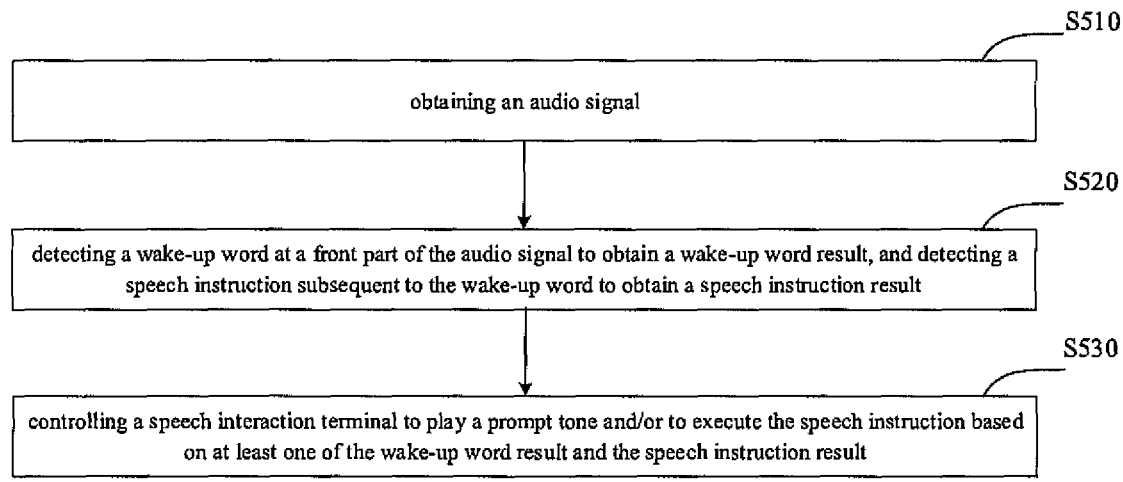
FIG. 5 is a flow chart illustrating a control method for speech interaction according to a fifth embodiment of the present disclosure.

According to embodiments of the present disclosure, FIG. 5 is a flow chart illustrating a control method for speech interaction according to a fifth embodiment of the present disclosure. Embodiments of the present disclosure are applicable to a case for performing detection on an audio signal as a whole. The method is executed by a control apparatus for speech interaction. The apparatus is implemented by software and/or hardware, and is specifically configured in an electronic device with certain data operation capability. The electronic device includes, but is not limited to, an intelligent device, such as a speech interaction terminal, and a server. The speech interaction terminal includes, but is not limited to, an intelligent speaker, an intelligent home system and an intelligent watch. The server is preferably deployed in the cloud.

The control method for the speech interaction illustrated in FIG. 5 includes the following.

At block S510, an audio signal is obtained.

In this embodiment, the audio signal may be a collected audio signal or an audio signal sent by the speech interaction terminal. According to the description for the above embodiments, the action in this embodiment is executed by the server. The audio signal sent by the speech interaction terminal includes the audio signal corresponding to the target wake-up word and a subsequent audio signal. The server completes an instruction response by interacting with the speech interaction terminal. An algorithm with high-precision and a complex and huge construction for performing re-detection on the audio signal is deployed in the server. By employing the server with a huge storage capacity and computational efficiency, the accuracy of the re-detection is improved, and the accuracy of the instruction response is further improved.

At block S520, a wake-up word at a front part of the audio signal is detected to obtain a wake-up word result, and a speech instruction subsequent to the wake-up word is detected to obtain a speech instruction result.

When only the wake-up word is simply detected in the above embodiments, there is a high false alarm rate due to the less number of syllables of wake-up word, especially the number of syllables of the target wake-up word. In order to reduce the false alarm rate, the audio signal is detected as a whole in this embodiment.

In some embodiments, it is firstly detected whether the front part of the audio signal includes the wake-up word. When the front part of the audio signal includes the wake-up word, there also needs to detect whether the wake-up word is the target wake-up word or the ordinary wake-up word. Description for the target wake-up word and the ordinary wake-up word refers to the above embodiments, which is not elaborated here.

The front part of the audio signal may be a signal with a set duration, such as a signal with a duration of 2 seconds or 3 seconds.

The detection for the speech instruction is performed on the subsequent audio signal in three conditions based on a wake-up word result of the front part. In some embodiments, when the wake-up word result indicates that the target wake-up word is detected, the part of the audio signal corresponding to the target wake-up word may be removed from the audio signal, and a remaining audio signal may be detected to obtain the speech instruction or a non-interaction speech signal (i.e., a non-speech signal or a communication signal between users or between things). When the wake-up word result indicates that the ordinary wake-up word is detected, the part of the audio signal corresponding to the ordinary wake-up word may be removed from the audio signal, and a remaining audio signal may be detected to obtain the speech instruction or the non-interaction speech signal. When the wake-up word result indicates that no wake-up word is detected, which is considered to be a noise, the subsequent audio signal may not be detected.

At block S530, the speech interaction terminal is controlled to play a prompt tone and/or to execute the speech instruction based on at least one of the wake-up word result and the speech instruction result.

The operation whether the wake-up word is detected indicates whether the user expects the speech interaction terminal to respond. The target wake-up word and the ordinary wake-up word indicate how the user interacts with the speech interaction terminal, such as one round of interaction or two rounds of interaction. Therefore, at least one of playing the prompt tone and executing the speech instruction is executed.

In some embodiments, when the wake-up word result indicates that the target wake-up word is detected and the speech instruction result indicates that the speech instruction is detected, the speech interaction terminal is controlled to execute the speech instruction. When the wake-up word result indicates that the ordinary wake-up word is detected and the speech instruction result indicates that the speech instruction is detected, the speech interaction terminal is controlled to play the prompt tone. When the wake-up word result indicates that the target wake-up word or the ordinary wake-up word is detected, and the speech instruction result indicates that the non-interaction signal is detected, the speech interaction terminal is controlled to play the prompt tone to guide the user to clarify a desired command to the speech interaction terminal. For example, a query speech "Please say it again" is further sent out as a response. In some embodiments, when the wake-up word result indicates that no wake-up word is detected, which is deemed as a noise, a dummy instruction is directly sent to the speech interaction terminal, and the speech interaction terminal does not respond to the dummy instruction, thereby successfully solving the interference caused by a false alarm of the wake-up word to the system.

In some conditions, when the wake-up word result indicates that the ordinary wake-up word is detected, the remaining audio signal may be detected no longer, and the speech interaction terminal may be directly controlled to play the prompt tone; or the speech interaction terminal is controlled to play the prompt tone and to execute the speech instruction.

In some embodiments, when the executive subject is the server, the speech instruction and/or the prompt-tone playing instruction may be sent to the speech interaction terminal to control the speech interaction terminal to play the prompt tone or to execute the speech instruction.

With this embodiment, the audio signal as a whole is detected, and the detection for the front part of the wake-up word is effectively assisted by the detection for the speech instruction. When the speech instruction is not detected, it indirectly indicates that the detection for the target wake-up word is wrong, thereby reducing the false alarm rate.

Figure 6:
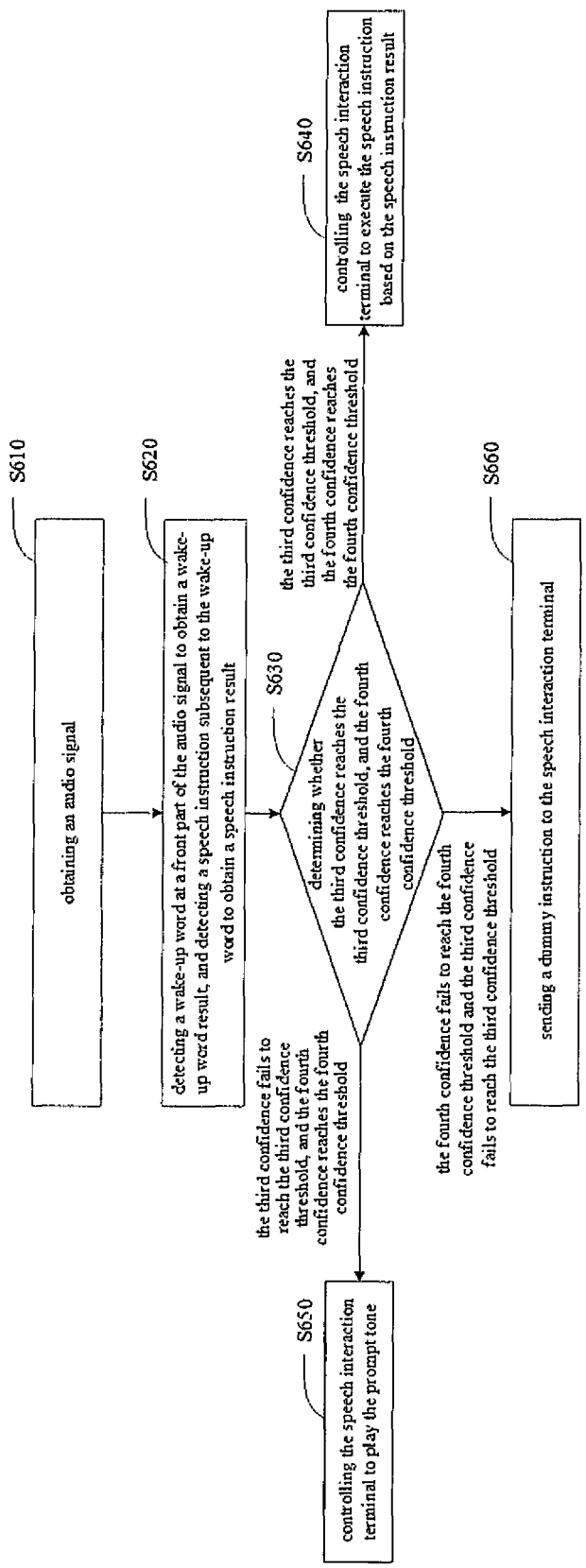
FIG. 6 is a flow chart illustrating a control method for speech interaction according to a sixth embodiment of the present disclosure.

According to embodiments of the present disclosure, FIG. 6 is a flow chart illustrating a control method for speech interaction according to a sixth embodiment of the present disclosure. This embodiment optimizes the control procedure of the speech interaction terminal on the basis of the above embodiments, In some embodiments, the operation "controlling a speech interaction terminal to play a prompt tone and/or to execute the speech instruction based on at least one of the wake-up word result and the speech instruction result" is refined into the operation "controlling the speech interaction terminal to execute the speech instruction based on the speech instruction result in a case that the third confidence reaches a third confidence threshold; and controlling the speech interaction terminal to play the prompt tone in a case that the third confidence fails to reach the third confidence threshold".

In some embodiments, the operation "controlling a speech interaction terminal to play a prompt tone and/or to execute the speech instruction based on at least one of the wake-up word result and the speech instruction result" is refined into the operation "controlling the speech interaction terminal to execute the speech instruction and/or to play the prompt tone based on the speech instruction result in a case that the fourth confidence reaches a fourth confidence threshold; and controlling the speech interaction terminal to send a dummy instruction in a case that the fourth confidence fails to reach the fourth confidence threshold and the third confidence fails to reach the third confidence threshold".

The control method for the speech interaction illustrated in FIG. 6 includes the following.

At block S610, an audio signal is obtained.

At block S620, a wake-up word at a front part of the audio signal is detected to obtain a wake-up word result, and a speech instruction subsequent to the wake-up word is detected to obtain a speech instruction result.

At block S630, it is determined whether the third confidence reaches the third confidence threshold, and the fourth confidence reaches the fourth confidence threshold. When the third confidence reaches the third confidence threshold, the action at block S640 is performed. When the third confidence fails to reach the third confidence threshold, the action at block S650 is performed. When the fourth confidence reaches the fourth confidence threshold, the action at block S640 and/or block S650 is performed. When the fourth confidence fails to reach the fourth confidence threshold and the third confidence fails to reach the third confidence threshold, the action at block S660 is performed.

The wake-up word result includes the third confidence and the fourth confidence. The third confidence is configured to represent a reliability that the front part of the audio signal includes the target wake-up word. The fourth confidence is configured to represent a reliability that the front part of the audio signal includes the ordinary wake-up word.

The third (or fourth) confidence threshold may be a confidence threshold or a confidence interval, which represents a critical point of the reliability that the front part of the audio signal includes the target (or ordinary) wake-up word. When the third (or fourth) confidence reaches the third (or fourth) confidence threshold, such as exceeding the third (or fourth) confidence threshold, it is considered that the target (or ordinary) wake-up word is detected. When the third (or fourth) confidence fails to reach the third (or fourth) confidence threshold, such as not exceeding the third (or fourth) confidence threshold, it is considered that the target (or ordinary) wake-up word is not detected.

At block S640, the speech interaction terminal is controlled to execute the speech instruction based on the speech instruction result.

At block S650, the speech interaction terminal is controlled to play the prompt tone.

At block S660, a dummy instruction is sent to the speech interaction terminal.

When it is determined that the false alarm is caused by a noise, and no wake-up occurs, the dummy instruction is directly sent to the speech interaction terminal, and the speech interaction terminal does not respond to the dummy instruction, thereby successfully solving the interference caused by the false alarm of the wake-up word to the system.

Detection for the wake-up word result and the speech instruction result will be made in detail in following embodiments.

With this embodiment, by judging the confidence, it may be clear whether the wake-up word is detected and whether the wake-up word is the target wake-up word or the ordinary wake-up word, and a control mode of the speech interaction terminal is further determined based on the speech instruction result, thereby improving the detection accuracy for the wake-up word and the speech instruction.

Figure 7:
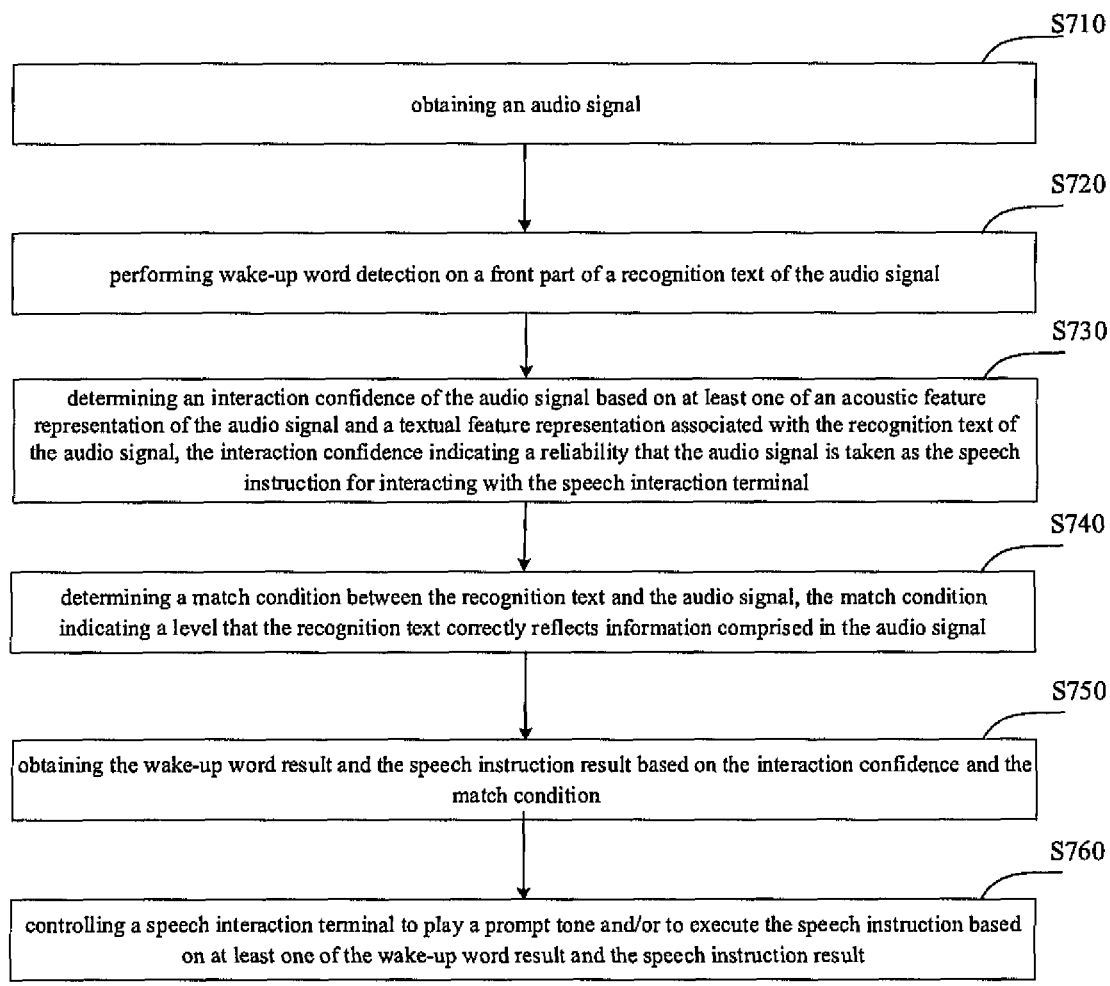
FIG. 7 is a flow chart illustrating a control method for speech interaction according to a seventh embodiment of the present disclosure.

According to embodiments of the present disclosure, FIG. 7 is a flow chart illustrating a control method for speech interaction according to a seventh embodiment of the present disclosure.

This embodiment optimizes the detection procedure for the wake-up word and the speech instruction on the basis of the above embodiments.

The control method for the speech interaction illustrated in FIG. 7 includes the following. At block 710, an audio signal is obtained.

At block 720, wake-up word detection is performed on a front part of a recognition text of the audio signal.

The electronic device is disposed with a decoder for recognizing a text (referred as the recognition text) corresponding to the audio signal. Since the wake-up word is located at the front part of the audio signal, the wake-up word may also be located at the front part of the recognition text. Therefore, the target wake-up word or the ordinary wake-up word is detected from the front part of the recognition text.

At block 730, an interaction confidence of the audio signal is determined based on at least one of an acoustic feature representation of the audio signal and a textual feature representation associated with the recognition text of the audio signal. The interaction confidence indicates a reliability that the audio signal is taken as the speech instruction for interacting with the speech interaction terminal.

In a control procedure of the speech interaction, it is expected that a real speech command of the user is responded in time and correctly, and the confidence of the audio signal needs to be judged. In detail, the interaction confidence may be determined based on a whole of the audio signal and/or the recognition text. The interaction confidence may indicate that the audio signal is a real speech, and the audio signal, i.e., a speech instruction, is used for interaction. By determining whether the audio signal belongs to the real speech, a sound (such as, various environmental sounds) without a speech may be prevented from being detected as a speech and from recognizing a text from the sound in a previous procedure. In order to distinguish whether the user is interacting with the speech interaction terminal or other people around, it is determined whether the audio signal is used for interaction.

An overall interaction confidence may be determined based on the acoustic feature representation of the audio signal and/or the textual feature representation of the recognition text. The acoustic feature representation facilitates to capture a difference between the speech and the non-speech, and may also distinguishes a speech used for interaction from a speech not used for interaction. The textual feature representation of the recognition text may be determined based on semantics. The text recognized from a non-speech sound signal is usually meaningless, and the interaction between the user and the speech interaction terminal may be distinguished semantically. In some embodiments, the analysis for the audio signal and the recognition text may be realized by means of a machine learning model.

At block 740, a match condition between the recognition text and the audio signal is determined. The match condition indicates a level that the recognition text correctly reflects information included in the audio signal.

The match condition between the recognition text and the audio signal is determined. The match condition indicates the level that the recognition text correctly reflects information included in the audio signal. The interaction confidence is configured to determine whether the audio signal is the speech instruction for interacting with the speech interaction terminal based on a probability. The intention of the user is generally understood based on the recognition text in response to determining a way for responding to the speech instruction.

The recognition text may be expressed as a sequence of one or more units based on different granularities. Each unit may be a word, a syllable, a pixel, a phoneme, a sub-phoneme or a combination thereof. It may be recognized whether the audio signal matches to the recognition text one by one at the unit level of the recognition text based on the match condition between the recognition text and the audio signal, and the procedure may decide the way for responding to the speech instruction. In some embodiments, the match condition between the recognition text and the audio signal may also be determined by means of the machine learning model.

At block 750, the wake-up word result and the speech instruction result are obtained based on the interaction confidence, and the match condition.

In some embodiments, the action at block S720-S750 may be respectively implemented by multiple neural network models based on deep learning.

At block 760, the speech interaction terminal is controlled to play a prompt tone and/or to execute the speech instruction based on at least one of the wake-up word result and the speech instruction result.

In some embodiments, when the target wake-up word is detected from the front part of the recognition text, the interaction confidence of the audio signal is greater than the set threshold, and it is determined that the recognition text matches the audio signal one by one, the third confidence corresponding to the target wake-up word is high, and the speech instruction is detected. In a case, the target wake-up word is detected from the front part of the recognition text, and the interaction confidence of the audio signal is greater than the set threshold, the third confidence corresponding to the target wake-up word is high, but the recognition text does not match the audio signal. If an intention of the user may still be correctly determined from the recognition text, the speech interaction terminal may still respond immediately. When the intention of the user may not be accurately determined from the recognition text, a guidance feedback as a response to the user may be determined based on the match condition, such that the user is guided to clarify the desired command to the speech interaction terminal. When the target wake-up word is detected from the front part of the recognition text, but the interaction confidence of the audio signal is lower than or equal to the set threshold, the third confidence is low, and the speech interaction terminal may be controlled to play the prompt tone.

In some embodiments, in a case that the ordinary wake-up word is detected from the front part of the recognition text, the interaction confidence of the audio signal is greater than the set threshold, and it is determined that the recognition text matches the audio signal one by one, the fourth confidence corresponding to the target wake-up word is high, and the speech instruction is detected. In this case, the speech instruction subsequent to the ordinary wake-up word may be responded to, and/or the speech interaction terminal is controlled to play the prompt tone. When the ordinary wake-up word is detected from the front part of the recognition text, the interaction confidence of the audio signal is lower than or equal to the set threshold, or it is determined that the recognition text does not match the audio signal, the fourth confidence is low, and a dummy instruction is sent to the speech interaction terminal.

When no wake-up word is detected from the front part of the recognition text, both the third confidence level and the fourth confidence level are low, and the dummy instruction is sent to the speech interaction terminal.

In this embodiment, when the ordinary wake-up word is detected, the speech interaction terminal is controlled to play the prompt tone, or to respond to the speech instruction subsequent to the ordinary wake-up word in the audio signal. In this way, the speech interaction terminal is compatible with the prompt tone response procedure and the speech interaction procedure of the ordinary wake-up word, and the speech interaction procedure of a combination of the ordinary wake-up word and the speech instruction is provided, thereby improving the fault tolerance and meeting the diversified usage habits of the user.

Further, the interaction confidence and the match condition are measured based on judgment of the interaction speech and fine evaluation of the recognition text. In this way, control for the speech interaction is facilitated, the respond may be executed accurately and quickly, and no respond may be executed to the non-speech signal. For a condition that a sound belongs to the speech instruction, but the text fails to accurately be recognized from the sound, a respond way may be further determined based on the match condition. As a detailed example, the user speaks "Xiao Du, I want to listen to Jay Chou's Rice Field", and the recognition text is "Xiao Du, I want to listen to Jay Chou's tower". On the one hand, the target wake-up word "Xiao Du" in the front part of the recognition text, on the other hand, it is determined based on the interaction confidence that the user is currently interacting with the speech interaction terminal via the audio signal and/or the recognition text. However, the match confidence of "I want to listen to Jay Chou" in the recognition text is high, while the match confidence of "the tower" is low. In the case, a guidance as a response may be made to the user based on the match condition between the recognition text and the audio signal, such that the user further clarifies the intention of the user.

Figure 8:
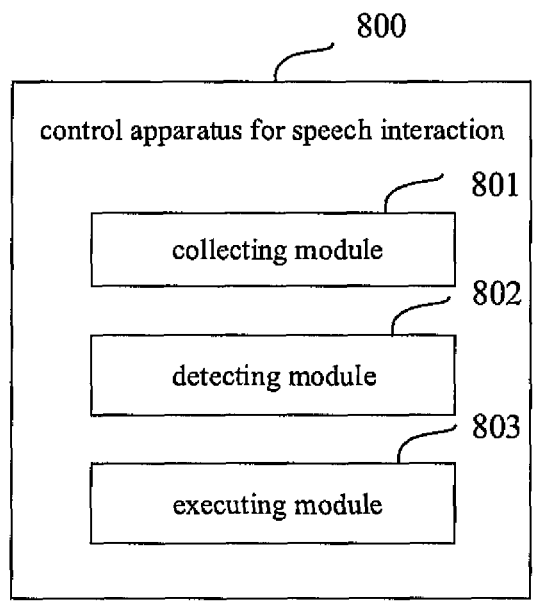
FIG. 8 is a block diagram illustrating a control apparatus for speech interaction according to embodiments of the present disclosure.

According to embodiments of the present disclosure, FIG. 8 is a block diagram illustrating a control apparatus for speech interaction according to embodiments of the present disclosure. Embodiments of the present disclosure are applicable to a case for detecting a wake-up word from an audio signal. The control apparatus is implemented by software and/or hardware, and is specifically configured in an electronic device with certain data operation capability.

The control apparatus 800 for the speech interaction illustrated in FIG. 8 includes: a collecting module 801, a detecting module 802, and an executing module 803. The collecting module 801 is configured to collect an audio signal. The detecting module 802 is configured to detect a wake-up word in the audio signal to obtain a wake-up word result. The executing module 803 is configured to play a prompt tone and/or to execute a speech instruction in the audio signal based on the wake-up word result.

With the control apparatus for the speech interaction according to this embodiment, the wake-up word and the speech instruction are allowed to be send out together by the user. The wake-up word in the audio signal is detected, and the prompt tone is played and/or the speech instruction is executed based on the detected wake-up word result, such that the response for the speech instruction is completed by one round of interaction, the requirement of the user is met, the interaction length is reduced, and the speech instruction may reach to the electronic device and be responded quickly.

Further, the wake-up word result includes a first confidence. The first confidence is configured to represent a reliability that the audio signal includes a target wake-up word. The executing module 803 includes: an instruction executing module and a playing module. The instruction executing module is configured to execute the speech instruction in a case that the first confidence reaches a first confidence threshold. The playing module is configured to play the prompt tone in a case that the first confidence fails to reach the first confidence threshold.

Further, the control apparatus 800 also includes a playing prohibition module, configured to withhold from playing the prompt tone before or when executing the speech instruction in the audio signal based on the wake-up word result.

Further, the wake-up word result includes a second confidence. The second confidence is configured to represent a reliability that the audio signal includes an ordinary wake-up word. The executing module 803 is configured to play the prompt tone in a case that the second confidence reaches the second confidence threshold and the first confidence fails to reach the first confidence threshold.

Further, the ordinary wake-up word includes at least one target wake-up word. The detecting module 802 includes: a primary detecting module, a secondary detecting module, and a determining module. The primary detecting module is configured to perform a primary detection on the target wake-up word in the audio signal by employing a wake-up word detection model to obtain a first detection result. The secondary detecting module is configured to perform a secondary detection on the target wake-up word within a set period after the primary detection to obtain a second detection result. The determining module is configured to determine the first confidence and the second confidence based on the first detection result and the second detection result.

Further, the speech instruction is obtained by detecting a part subsequent to the wake-up word in the audio signal.

Further, the apparatus 800 is configured in a speech interaction terminal. The instruction executing module includes: a sending sub-unit and an obtaining sub-unit. The sending sub-unit is configured to send the audio signal including the target wake-up word and the speech instruction subsequent to the target wake-up word to a server in the case that the first confidence reaches the first confidence threshold, such that the server detects the wake-up word at a front part of the audio signal and the speech instruction subsequent to the wake-up word. The obtaining sub-unit is configured to obtain the speech instruction from the server and to execute the speech instruction.

Further, the target wake-up word is a word with less than four syllables; and the ordinary wake-up word is a word with four or more syllables.

Further, the number of syllables of the target wake-up word is same as that of the ordinary wake-up word.

The above control apparatus for the speech interaction may execute the control method for the speech interaction according to any one of embodiments of the present disclosure, and has corresponding functional modules and beneficial effects for executing the control method of the speech interaction.

Figure 9:
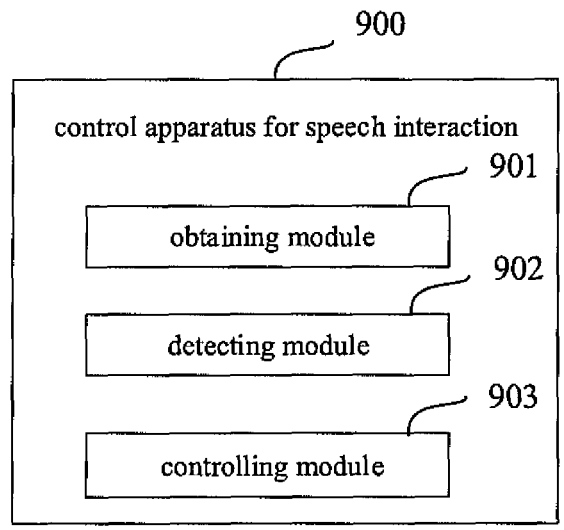
FIG. 9 is a block diagram illustrating a control apparatus for speech interaction according to embodiments of the present disclosure.

According to embodiments of the present disclosure, FIG. 9 is a block diagram illustrating a control apparatus for speech interaction according to embodiments of the present disclosure. Embodiments of the present disclosure are applicable to a case for detecting a wake-up word from an audio signal. The control apparatus is implemented by software and/or hardware, and is specifically configured in an electronic device with certain data operation capability.

The control apparatus 900 for the speech interaction illustrated in FIG. 9 includes: an obtaining module 901, a detecting module 902, and a controlling module 903. The obtaining module 901 is configured to obtain an audio signal. The detecting module 902 is configured to detect a wake-up word at a front part of the audio signal to obtain a wake-up word result, and to detect a speech instruction subsequent to the wake-up word to obtain a speech instruction result. The controlling module 903 is configured to control a speech interaction terminal to play a prompt tone and/or to execute the speech instruction based on at least one of the wake-up word result and the speech instruction result.

With this embodiment, the audio signal as a whole is detected, and the detection for the front part of the wake-up word is effectively assisted by the detection for the speech instruction. When the speech instruction is not detected, it indirectly indicates that the detection for the target wake-up word is wrong, thereby reducing the false alarm rate.

Further, the wake-up word result includes a third confidence. The third confidence is configured to represent a reliability that the front part of the audio signal includes a target wake-up word. The controlling module 903 includes: a first executing unit and a controlling unit. The first executing unit is configured to control the speech interaction terminal to execute the speech instruction based on the speech instruction result in a case that the third confidence reaches a third confidence threshold. The controlling unit is configured to control the speech interaction terminal to play the prompt tone in a case that the third confidence fails to reach the third confidence threshold.

Further, the wake-up word result includes a fourth confidence. The fourth confidence is configured to represent a reliability that the front part of the audio signal includes an ordinary wake-up word. The controlling module 903 includes: a second executing unit and a sending unit. The second executing unit is configured to control the speech interaction terminal to execute the speech instruction and/or to play the prompt tone based on the speech instruction result in a case that the fourth confidence reaches a fourth confidence threshold. The sending unit is configured to control the speech interaction terminal to send a dummy instruction in a case that the fourth confidence fails to reach the fourth confidence threshold and the third confidence fails to reach the third confidence threshold.

Further, the detecting module 902 includes: a detecting unit, an interaction confidence determining unit, a match condition determining unit, and a result obtaining unit. The detecting unit is configured to perform wake-up word detection on a front part of a recognition text of the audio signal. The interaction confidence determining unit is configured to determine an interaction confidence of the audio signal based on at least one of an acoustic feature representation of the audio signal and a textual feature representation associated with the recognition text of the audio signal, the interaction confidence indicating a reliability that the audio signal is taken as the speech instruction for interacting with the speech interaction terminal. The match condition determining unit is configured to determine a match condition between the recognition text and the audio signal. The match condition indicates a level that the recognition text correctly reflects information included in the audio signal. The result obtaining unit is configured to the wake-up word result and the speech instruction result based on the interaction confidence, and the match condition.

Further, the control apparatus 900 is configured in a server. The obtaining module 901 is configured to receive the audio signal sent by the speech interaction terminal.

The above control apparatus for the speech interaction may execute the control method for the speech interaction according to any one of embodiments of the present disclosure, and has corresponding functional modules and beneficial effects for executing the control method of the speech interaction.

According to embodiments of the present disclosure, the present disclosure also provides an electronic device and a readable storage medium.

Figure 10:
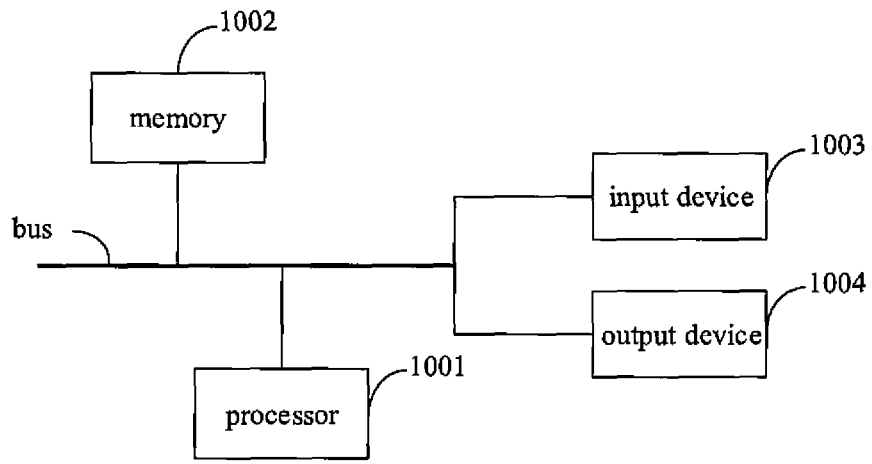
FIG. 10 is a block diagram illustrating an electronic device capable of implementing a control method for speech interaction according to embodiments of the present disclosure.

As illustrated in FIG. 10, FIG. 10 is a block diagram illustrating an electronic device capable of implementing a control method for speech interaction according to embodiments of the present disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, an intelligent phone, a wearable device and other similar computing device. The components, connections and relationships of the components, and functions of the components illustrated herein are merely examples, and are not intended to limit the implementation of the present disclosure described and/or claimed herein.

As illustrated in FIG. 10, the electronic device includes: one or more processors 1001, a memory 1002, and interfaces for connecting various components, including a high-speed interface and a low-speed interface. Various components are connected to each other through different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 10, a processor 1001 is taken as an example.

The memory 1002 is a non-transitory computer readable storage medium provided by the present disclosure. The memory is configured to store instructions executable by at least one processor, to enable the at least one processor to execute a control method for speech interaction provided by the present disclosure. The non-transitory computer readable storage medium provided by the present disclosure is configured to store computer instructions. The computer instructions are configured to enable a computer to execute the control method for the speech interaction provided by the present disclosure.

As the non-transitory computer readable storage medium, the memory 1002 may be configured to store non-transitory software programs, non-transitory computer executable programs and modules, such as program instructions/modules (such as, the collecting module 801, the detecting module 802, and the executing module 803 illustrated in FIG. 8, and the obtaining module 901, the detecting module 902, and the controlling module 903 illustrated in FIG. 9) corresponding to the control method for the speech interaction according to embodiments of the present disclosure. The processor 1001 executes various functional applications and data processing of the server by operating non-transitory software programs, instructions and modules stored in the memory 1002, that is, implements the control method for the speech interaction according to the above method embodiment.

The memory 1002 may include a storage program region and a storage data region. The storage program region may store an application required by an operating system and at least one function. The storage data region may store data created according to usage of the electronic device controlled based on the speech interaction. In addition, the memory 1002 may include a high-speed random access memory, and may also include a non-transitory memory, such as at least one disk memory device, a flash memory device, or other non-transitory solid-state memory device. In some embodiments, the memory 1002 may alternatively include memories remotely located to the processor 1001, and these remote memories may be connected to the electronic device controlled based on the speech interaction via a network. Examples of the above network include, but are not limited to, an Internet, an intranet, a local area network, a mobile communication network and combinations thereof.

The electronic device capable of implementing the control method for the speech interaction may also include: an input device 1003 and an output device 1004. The processor 1001, the memory 1002, the input device 1003, and the output device 1004 may be connected via a bus or in other means. In FIG. 10, the bus is taken as an example.

The input device 1003 may receive inputted digital or character information, and generate key signal input related to user setting and function control of the electronic device, such as a touch screen, a keypad, a mouse, a track pad, a touch pad, an indicator stick, one or more mouse buttons, a trackball, a joystick and other input device. The output device 1004 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

Figure 11:
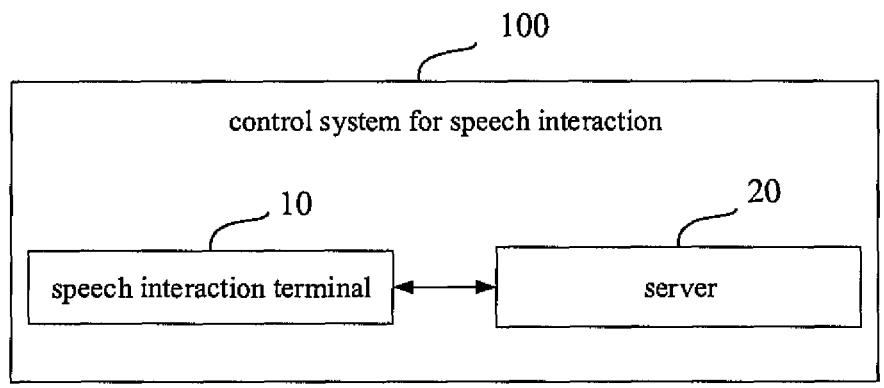
FIG. 11 is a block diagram illustrating a control system for speech interaction according to embodiments of the present disclosure.

According to embodiments of the present disclosure, FIG. 11 is a block diagram illustrating a control system for speech interaction according to embodiments of the present disclosure. This embodiment provides a control system 100 for speech interaction, including a speech interaction terminal 10 and a server 20. The server 20 may deployed in the cloud, and the speech interaction terminal 10 includes, but is not limited to, an intelligent speaker, an intelligent homes system and an intelligent watch. Description will be made in detail to the speech interaction terminal 10 and the server 20 with reference to FIG. 11.

As illustrated in FIG. 11, the speech interaction terminal 10 is configured to collect an audio signal; to detect a wake-up word in the audio signal to obtain a wake-up word result; to send the audio signal including the wake-up word and a speech instruction subsequent to the wake-up word to the server 20 based on the wake-up word result; and/or to play a prompt tone; and to receive the speech instruction and/or a prompt-tone playing instruction returned by the server 20.

In some embodiments, the wake-up word may be a target wake-up word or an ordinary wake-up word. The description for the target wake-up word and the ordinary wake-up word is made detailed in the above embodiments, which is not elaborated here.

The speech interaction terminal 10 is configured to play the prompt tone by executing the prompt-tone playing instruction.

The server 20 is configured to receive the audio signal sent by the speech interaction terminal 10; to detect the wake-up word at a front part of the audio signal to obtain the wake-up word result, and to detect the speech instruction subsequent to the wake-up word to obtain a speech instruction result; and to send the speech instruction and/or the prompt-tone playing instruction to the speech interaction terminal based on at least one of the wake-up word result and the speech instruction result.

With the control system for the speech interaction according to this embodiment, the wake-up word and the speech instruction are allowed to be send out together by the user, such that the response for the speech instruction is completed by one round of interaction, the requirement of the user is met, the interaction length is reduced, and the speech instruction may reach to the electronic device and be responded quickly. The speech interaction terminal 10 detects the wake-up word in the audio signals at one time, and sends the audio signal corresponding to the wake-up word and a subsequent audio signal to the server 20, such that the whole audio signal is detected again by the server 20, and the recognition accuracy of the wake-up word and the speech instruction is improved.

In some embodiments, the wake-up word result includes a first confidence. The first confidence is configured to represent a reliability that the audio signal includes a target wake-up word. Correspondingly, when the audio signal including the wake-up word and the speech instruction subsequent to the wake-up word is sent to the server 20 based on the wake-up word result, the speech interaction terminal 10 is configured to send the audio signal including the target wake-up word and a speech instruction subsequent to the target wake-up word to the server 20 in a case that the first confidence reaches the first confidence threshold. The speech interaction terminal 10 is configured to play the prompt tone in a case that the first confidence fails to reach the first confidence threshold when playing the prompt tone based on the wake-up word result.

In some embodiments, the speech interaction terminal 10 is configured to withhold from playing the prompt tone before or when executing the speech instruction returned by the server 20.

In some embodiments, the wake-up word result includes a second confidence. The second confidence is configured to represent a reliability that the audio signal includes an ordinary wake-up word. Correspondingly, when the prompt tone is played based on the wake-up word result, the speech interaction terminal 10 is configured to play the prompt tone in a case that the second confidence reaches the second confidence threshold and the first confidence fails to reach the first confidence threshold.

In some embodiments, the ordinary wake-up word includes at least one target wake-up word. Correspondingly, when the wake-up word in the audio is detected, the speech interaction terminal 10 is configured to: perform a primary detection on the target wake-up word in the audio signal by employing a wake-up word detection model to obtain a first detection result; perform a secondary detection on the target wake-up word within a set period after the primary detection to obtain a second detection result; and determine the first confidence and the second confidence based on the first detection result and the second detection result.

In some embodiments, the speech instruction is obtained by detecting a part subsequent to the wake-up word in the audio signal.

In some embodiments, the target wake-up word is a word with less than four syllables; and the ordinary wake-up word is a word with four or more syllables.

In some embodiments, the number of syllables of the target wake-up word is the same as that of the ordinary wake-up word.

In some embodiments, the wake-up word result includes a third confidence. The third confidence is configured to represent a reliability that the front part of the audio signal includes a target wake-up word. When the speech instruction and/or the prompt-tone playing instruction is sent to the speech interaction terminal based on the at least one of the wake-up word result and the speech instruction result, the server 20 is configured to: send the speech instruction to the speech interaction terminal 10 based on the speech instruction result in a case that the third confidence reaches a third confidence threshold; and send the prompt-tone playing instruction to the speech interaction terminal 10 in a case that the third confidence fails to reach the third confidence threshold.

In some embodiments, the wake-up word result includes a fourth confidence. The fourth confidence is configured to represent a reliability that the front part of the audio signal includes an ordinary wake-up word. When the speech instruction and/or the prompt-tone playing instruction is sent to the speech interaction terminal 10 based on the at least one of the wake-up word result and the speech instruction result, the server 20 is configured to: send the speech instruction and/or the prompt-tone playing instruction to the speech interaction terminal 10 based on the speech instruction result in a case that the fourth confidence reaches a fourth confidence threshold; and send a dummy instruction to the speech interaction terminal 10 in a case that the fourth confidence fails to reach the fourth confidence threshold and the third confidence fails to reach the third confidence threshold.

In some embodiments, when the wake-up word at the front part of the audio signal and the speech instruction subsequent to the wake-up word are received, the server 20 is configured to: perform wake-up word detection on a front part of a recognition text of the audio signal; determine an interaction confidence of the audio signal based on at least one of an acoustic feature representation of the audio signal and a textual feature representation associated with the recognition text of the audio signal, the interaction confidence being configured to a reliability that the audio signal is taken as the speech instruction for interacting with the speech interaction terminal; determine a match condition between the recognition text and the audio signal, the match condition indicating a level that the recognition text correctly reflects information included in the audio signal; and obtain the wake-up word result and the speech instruction result based on the interaction confidence, and the match condition.

With the control system provided by this embodiment, description for the speech interaction terminal 10 and the server 20 are made in detail in the above embodiments, and has the technical effects of the above embodiments, which is not elaborated here.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components, or the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and usually interact via the communication network. A relationship between the client and the server is generated by computer programs operated on a corresponding computer and having a client-server relationship with each other. The server may be a cloud server, also referred as a cloud computing server or cloud host, which is a host product in a cloud computing service system, to solve defects of difficult management and weak business scalability in a conventional physical host and VPS service.

It should be understood that, steps may be reordered, added or deleted by utilizing flows in the various forms illustrated above. For example, the steps described in the present disclosure may be executed in parallel, sequentially or in different orders, so long as desired results of the technical solution disclosed in the present disclosure may be achieved, there is no limitation here.

The above detailed implementations do not limit the protection scope of the present disclosure. It should be understood by the skilled in the art that various modifications, combinations, sub-combinations and substitutions may be made based on design requirements and other factors. Any modification, equivalent substitution and improvement made within the spirit and the principle of the present disclosure shall be included in the protection scope of present disclosure.

What is claimed is:

1. A control method for speech interaction, comprising:
   collecting an audio signal;
   detecting a wake-up word in the audio signal to obtain a wake-up word result; and
   playing a prompt tone and/or executing a speech instruction in the audio signal based on the wake-up word result,
   wherein the wake-up word result comprises a first confidence and a second confidence, the first confidence is configured to represent a reliability that the audio signal comprises a target wake-up word, the second confidence is configured to represent a reliability that the audio signal comprises an ordinary wake-up word, the number of syllables of the target wake-up word is no more than that of the ordinary wake-up word, and
   playing the prompt tone and/or executing the speech instruction in the audio signal based on the wake-up word result comprises:
   executing the speech instruction in a case that the first confidence reaches a first confidence threshold;
   playing the prompt tone in a case that the second confidence reaches a second confidence threshold and the first confidence fails to reach the first confidence threshold.

2. The method of claim 1, wherein before or when executing the speech instruction in the audio signal based on the wake-up word result, the method further comprises:
   withholding from playing the prompt tone.

3. The method of claim 1, wherein the ordinary wake-up word comprises at least one target wake-up word; and
   detecting the wake-up word in the audio signal comprises:
   performing a primary detection on the target wake-up word in the audio signal by employing a wake-up word detection model to obtain a first detection result;
   performing a secondary detection on the target wake-up word within a set period after the primary detection to obtain a second detection result; and
   determining the first confidence and the second confidence based on the first detection result and the second detection result.

4. The method of claim 1, wherein the speech instruction is obtained by detecting a part subsequent to the wake-up word in the audio signal.

5. The method of claim 1, wherein the method is executed by a speech interaction terminal; and
   executing the speech instruction in the case that the first confidence reaches the first confidence threshold comprises:
   sending the audio signal comprising the target wake-up word and the speech instruction subsequent to the target wake-up word to a server in the case that the first confidence reaches the first confidence threshold, such that the server detects the wake-up word at a front part of the audio signal and the speech instruction subsequent to the wake-up word; and
   obtaining the speech instruction from the server and executing the speech instruction.

6. The method of claim 1, wherein the target wake-up word is a word with less than four syllables; and the ordinary wake-up word is a word with four or more syllables.

7. The method of claim 1, wherein the number of syllables of the target wake-up word is same as that of the ordinary wake-up word.

8. A method for controlling a speech interaction, comprising:
   obtaining an audio signal;
   detecting a wake-up word at a front part of the audio signal and detecting a speech instruction subsequent to the wake-up word, to obtain a wake-up word result and a speech instruction result; and
   controlling a speech interaction terminal to play a prompt tone and/or to execute the speech instruction based on at least one of the wake-up word result and the speech instruction result,
   wherein the wake-up word result comprises a third confidence and a fourth confidence, the third confidence is configured to represent a reliability that the front part of the audio signal comprises a target wake-up word, the fourth confidence is configured to represent a reliability that the front part of the audio signal comprises an ordinary wake-up word, the number of syllables of the target wake-up word is no more than that of the ordinary wake-up word, and
   controlling the speech interaction terminal to play the prompt tone and/or to execute the speech instruction based on the at least one of the wake-up word result and the speech instruction result comprises:
   controlling the speech interaction terminal to execute the speech instruction based on the speech instruction result in a case that the third confidence reaches a third confidence threshold;

controlling the speech interaction terminal to play the prompt tone in a case that the third confidence fails to reach the third confidence threshold;

controlling the speech interaction terminal to execute the speech instruction and/or to play the prompt tone based on the speech instruction result in a case that the fourth confidence reaches a fourth confidence threshold; and controlling the speech interaction terminal to send a dummy instruction in a case that the fourth confidence fails to reach the fourth confidence threshold and the third confidence fails to reach the third confidence threshold.

9. The method of claim 8, wherein detecting the wake-up word at the front part of the audio signal and detecting the speech instruction subsequent to the wake-up word, to obtain the wake-up word result and the speech instruction result comprise:

performing wake-up word detection on a front part of a recognition text of the audio signal to obtain a wake-up word detection result of the front part;

determining an interaction confidence of the audio signal based on at least one of an acoustic feature representation of the audio signal and a textual feature representation associated with the recognition text of the audio signal, the interaction confidence indicating a reliability that the audio signal is taken as the speech instruction for interacting with the speech interaction terminal;

determining a match condition between the recognition text and the audio signal, the match condition indicating a level that the recognition text correctly reflects information comprised in the audio signal; and obtaining the wake-up word result and the speech instruction result based on the interaction confidence, the match condition and the wake-up word detection result of the front part.

10. The method of claim 8, wherein the method is executed by a server;

and obtaining the audio signal comprises:

receiving the audio signal sent by the speech interaction terminal.

11. A control apparatus for speech interaction, comprising:

a non-transitory computer-readable medium including computer-executable instructions stored thereon, and an instruction execution system which is configured by the instructions to implement at least one of:

a collecting module, configured to collect an audio signal;

a detecting module, configured to detect a wake-up word in the audio signal to obtain a wake-up word result; and an executing module, configured to play a prompt tone and/or to execute a speech instruction in the audio signal based on the wake-up word result, the wake-up word result comprises a first confidence and a second confidence, the first confidence is configured to represent a reliability that the audio signal comprises a target wake-up word, the second confidence is configured to represent a reliability that the audio signal comprises an ordinary wake-up word, the number of syllables of the target wake-up word is no more than that of the ordinary wake-up word, and the executing module comprises:

an instruction executing module, configured to execute the speech instruction in a case that the first confidence reaches a first confidence threshold; and a playing module, configured to play the prompt tone in a case that the second confidence reaches the second confidence threshold and the first confidence fails to reach the first confidence threshold.

12. The apparatus of claim 11, the instruction execution system is further configured by the instructions to implement:

a playing prohibition module, configured to withhold from playing the prompt tone before or when executing the speech instruction in the audio signal based on the wake-up word result.

13. The apparatus of claim 11, wherein the ordinary wake-up word comprises at least one target wake-up word; and the detecting module comprises:

a primary detecting module, configured to perform a primary detection on the target wake-up word in the audio signal by employing a wake-up word detection model to obtain a first detection result;

a secondary detecting module, configured to perform a secondary detection on the target wake-up word within a set period after the primary detection to obtain a second detection result; and a determining module, configured to determine the first confidence and the second confidence based on the first detection result and the second detection result.

14. The apparatus of claim 11, wherein the speech instruction is obtained by detecting a part subsequent to the wake-up word in the audio signal.

15. The apparatus of claim 11, wherein the apparatus is provided in a speech interaction terminal; and the instruction executing module comprises:

a sending sub-unit, configured to send the audio signal comprising the target wake-up word and the speech instruction subsequent to the target wake-up word to a server in the case that the first confidence reaches the first confidence threshold, such that the server detects the wake-up word at a front part of the audio signal and the speech instruction subsequent to the wake-up word; and an obtaining sub-unit, configured to obtain the speech instruction from the server and to execute the speech instruction.

16. The apparatus of claim 11, wherein the target wake-up word is a word with less than four syllables; and the ordinary wake-up word is a word with four or more syllables.

17. The apparatus of claim 11, wherein the number of syllables of the target wake-up word is same as that of the ordinary wake-up word.

* * * * *